United States Patent [19]

Umemura et al.

[11] Patent Number: 5,708,637
[45] Date of Patent: Jan. 13, 1998

[54] METHOD AND APPARATUS FOR ENHANCED WRITING AND READING DATA

[75] Inventors: Kojiro Umemura, Kanagawa; Masakazu Suzuoki, Tokyo; Teiji Yutaka, Kanagawa, all of Japan

[73] Assignee: Sony Corporation, Tokyo, Japan

[21] Appl. No.: 565,720

[22] Filed: Nov. 30, 1995

[30] Foreign Application Priority Data

Nov. 30, 1994 [JP] Japan ................. 6-297415

[51] Int. Cl.$^6$ ................. G11B 5/09
[52] U.S. Cl. ................. 369/48; 369/60; 369/59
[58] Field of Search ................. 369/60, 59, 48, 369/47; 395/404; 365/189.04, 195, 196

[56] References Cited

U.S. PATENT DOCUMENTS

| | | | |
|---|---|---|---|
| 4,811,124 | 3/1989 | Dujari | 369/59 X |
| 5,224,208 | 6/1993 | Miller, Jr. et al. | 395/125 |
| 5,285,275 | 2/1994 | Abe | 348/384 |
| 5,291,468 | 3/1994 | Carmon | 369/48 X |
| 5,307,450 | 4/1994 | Grossman | 395/123 |
| 5,471,450 | 11/1995 | Yonemitsu | 369/60 |
| 5,491,677 | 2/1996 | Sasaki | 369/60 |
| 5,553,208 | 9/1996 | Murata et al. | 395/125 |
| 5,561,746 | 10/1996 | Murata et al. | 395/119 |
| 5,608,697 | 3/1997 | De Hasn | 369/48 |

FOREIGN PATENT DOCUMENTS

| | | |
|---|---|---|
| A-0 210 423 | 4/1987 | European Pat. Off. . |
| A-0 522 853 | 1/1993 | European Pat. Off. . |
| A-0 590 881 | 4/1994 | European Pat. Off. . |
| G-2-195-519A | 7/1988 | United Kingdom . |
| 2-231-245A | 7/1990 | United Kingdom . |
| 2272137 | 5/1994 | United Kingdom . |
| WO 84/02027 | 5/1984 | WIPO . |

OTHER PUBLICATIONS

Computer Technology Review, Special Summer Issue, 11 (1991) Jul., No. 9, Integrating Image Processing With Standard Workstation Platforms by David Pfeiffer, pp. 103, 104, 106 & 107.

IEEE Computer Graphics and Application, 11 (1991) Mar., No. 2, Graphics Workstations: A European Perspective by Ken Robbins, Mark Martin, Max Mehl, Allan Davison, Kieron Drake and Mel Slater, pp. 91–103.

SMPTE Journal, vol. 100, No. 3, Mar. 1991, US, pp. 162–166, XP000178490, Vigneaux, et al.: "A Real–Time Video Mapping and Manipulating System".

Computer Graphics Principles and Practice, 2d, , 1990, Addison–Wesley, Foley, et al., pp. 741–744.

Eurographics, 4–8 Sep. 1989, Amsterdam, pp. 257–268, SP000132231, Bennis and Gagalowicz: "Hierarchical Texture Synthesis on 3–D Surfaces".

*Primary Examiner*—Aristotelis M. Psitos
*Assistant Examiner*—Alan Faber
*Attorney, Agent, or Firm*—Fulwider Patton Lee & Utecht, LLP

[57] ABSTRACT

Data of a recording medium in a storage device is read out for every sector and is stored in a ring buffer under the control of a CPU which can vary the speed of readout from the buffer as the load on the system varies. Data stored in the ring buffer is read out for every frame and is outputted to an output device. When data read out from the recording medium is to be reproduced in real time, the data can be reproduced substantially at a speed corresponding to a reading speed of the data from the recording medium, with a minimum of data loss and enhanced temporal quality.

19 Claims, 6 Drawing Sheets

| FRAME DATA FORMAT IDENTIFIER FID | SECTOR NUMBER SN | TOTAL NUMBER OF SECTORS HS | FRAME NUMBER FN | FRAME DATA SIZE FS |
|---|---|---|---|---|

FIG.4

METHOD AND APPARATUS FOR ENHANCED WRITING AND READING DATA

This application claims priority under the International Convention based upon Japanese Patent Application No. P06-297415 filed Nov. 30, 1994.

BACKGROUND OF THE INVENTION

This invention relates generally to a signal reproducing system and, more particularly, to a new and improved method and apparatus for reading out recording data from a recording medium and reproducing such read-out data with enhanced efficiency.

Conventionally, a computer device is connected with an external storage device for recording therein information which has been processed within the computer device. The storage device may be a magnetic tape unit, a magnetic disk unit, a magnetic drum unit or the like.

To read out data from this storage device, data is read out from a recording medium provided in the storage device. In this case, a data structure referred to as a file system is provided in the recording medium, so that data is read out as one file from the recording medium.

To read out an extraordinarily large volume of data from the external storage device, it is common practice to partially read out the large volume of data and then to process the read-out data. In such a method for reading part of the data as one series of data, that is, as a file, the temporal rate for reading out the data is not usually adequate for satisfactory reproduction. In this regard, data written into the system in essentially real time cannot be processed rapidly enough as throughput to provide uninterrupted real-time output. Consequently, data pile up and annoying output glitches can detract substantially form ideal performance.

Moreover, in this same method for reading out data as a file, although reading of data is started for every instance of partial processing, the time from the start of reading of the data until the time that the data is actually read out varies in accordance with the position on the recording medium at which the data is recorded and the state of the computer device at the start of reading.

More, particularly, when a disc-shaped recording medium is used as the recording medium to read/write data therefrom/thereto, a seek operation is first performed wherein a head for writing or reading information to or from the disc-shaped recording medium is physically moved to a position on the disc-shaped recording medium where desired data is recorded. Since the seek operation is performed by driving a motor on which the head is mounted, reading of consecutive data is time-consuming, thus deteriorating the data reading efficiency.

Accordingly, there has been a long existing need for enhanced efficiencies in writing in and the reading out of data to overcome the aforementioned problems. The present invention clearly fulfills these needs.

SUMMARY OF THE INVENTION

Briefly, and in general terms, the present invention provides a signal reproducing method and apparatus whereby the time for reading out data can be effectively varied whenever a particular series of data recorded on the recording medium is written into the system to facilitate enhanced efficiency and greater compatibility between the process of writing in and of reading out data, whereby data loss is minimized.

In the system of the present invention, four types of data are typically used. The first two types of data, e.g., compression data to be decompressed (hereinafter "MDEC data") and audio data, i.e., sound and music, are input, i.e., written into the system and preferably processed in real-time. The other two types of data, e.g., polygon data and special effects data, need not be processed in real-time.

In the present invention, the real-time data is read from the recording medium and written into the system in real-time. However, as the load on the system increases, the variable reading speed of the CPU may not be able to fetch and process the input data rapidly enough to keep up with the input. If this occurs, some of the real-time data will be improperly discarded resulting in substantial undesirable glitches in the output.

In accordance with the present invention, a ring buffer or other suitable intermediate storage means is used to store the real-time data as it is input to the system. In this way, the ring buffer minimizes the loss of any real-time data. The ring buffer accomplishes this function by providing a constant write rate, i.e., input from a CD-ROM or the like to the system, but by varying its read rate, i.e., the output to the CPU. The read rate varies in response to the load on the CPU and,therefore, the read rate can be increased during periods of high system throughput of data and this feature, together with the buffer storage feature, combine to effectively minimize data loss. Accordingly, when writing of data overtakes reading of data, writing is stopped until reading catches up; then one or two frames are typically jumped or abandoned to restore a match between writing in and reading out. Frames are repeated at the output once or twice to compensate for such missing data, but such occurrences are brief, infrequent and virtually unnoticeable.

Hence, while it is possible for a frame of data adjacent to a processed frame to be abandoned, the ring buffer, in accordance with the present invention, reduces, if not eliminates, the need to discard such data.

In accordance with the present invention, by way of example, and not necessarily by way of limitation, there is provided a signal reproducing system for performing reproduction by reading data recorded on a recording medium, the system including a recording medium having data sequentially stored thereon for every frame as a data processing unit composed of one or more sectors as physical read-out units of data, ring-shaped storage means or the like for storing the data read out from the recording medium, data control means for sequentially reading frame data from the recording medium for every sector and storing the frame data in the ring-shaped storage means, and separately therefrom, reading the data stored in advance in the ring-shaped storage means for every frame, whereby when sector data read out from the recording medium cannot be written into the ring-shaped storage means, frame data next to data of a frame including the read-out sector is stored following frame data preceding to the frame including the read-out sector in the ring-shaped storage means.

The ring-shaped storage means denotes a so-called ring buffer, however, any suitable intermediate storage means may be utilized without department from the spirit and scope of the present invention.

The sector is composed of an additional information area having a data format of a frame in which this sector is included, a sector number indicating the sequence of sectors constituting the frame and the total number of sectors indicating the number of sectors constituting the frame, and a data area. The data control means uses the sector number and the total number of sectors in the sector to detect a final sector of the frame including the sector.

In accordance with the present invention, there is also provided a signal reproducing method associated with the aforedescribed system, wherein the method includes a data reading step for reading frame data for every sector from a recording medium which has data sequentially stored therein for every frame as a data processing unit composed of one or plural sectors as physical read-out units of data and, storing the frame data in ring-shaped storage means, and a frame data processing step for reading data stored in advance in the ring-shaped storage means for every frame, separately from the data reading step, whereby when sector data read out from the recording medium cannot be written into the ring-shaped storage means, frame data next to data of a frame including the read-out sector is stored following frame data preceding to the frame including the read-out sector in the ring-shaped storage means.

In addition, in accordance with the invention, where only sectors up to an intermediate sector of the sectors constituting the frame can be stored in the ring-shaped storage means when frame data recorded in the recording medium is to be read out for every sector and stored in the ring-shaped storage means, frame data which is next to the frame data having only the sectors up to an intermediate sector stored, is stored following frame data correctly stored in the ring-shaped storage means, and the frame data having only the sectors up to an intermediate sector stored is abandoned. Thus, the frame data read out from the recording medium and written into the system is reproduced at a speed corresponding to the reading speed, which can be varied by the CPU in the system.

The sector includes an additional information area having a data format of a frame in which this sector is included, a sector number indicating the sequence of sectors constituting the frame and the total number of sectors indicating the number of sectors constituting the frame, and a data area. Therefore, when the sector data is to be read out from the recording medium, positional information and data information in the frame can be sequentially detected.

In addition, as the final sector is detected using the sector number and the total number of sectors, a location in-between frames, that is, a cut point of frame data can be detected.

Hence, the present invention satisfies a long felt need for enhanced efficiencies in writing in and the reading out of data.

These and other objects and advantages of the invention will become apparent from the following more detailed description, when taken in conjunction with the accompanying drawings of illustrative embodiments.

DESCRIPTION OF THE DRAWINGS

FIG. 4 is illustrates the structure of a sector header area for use by the system of the present invention;

DESCRIPTION OF THE PREFERRED EMBODIMENT

Figure 1:
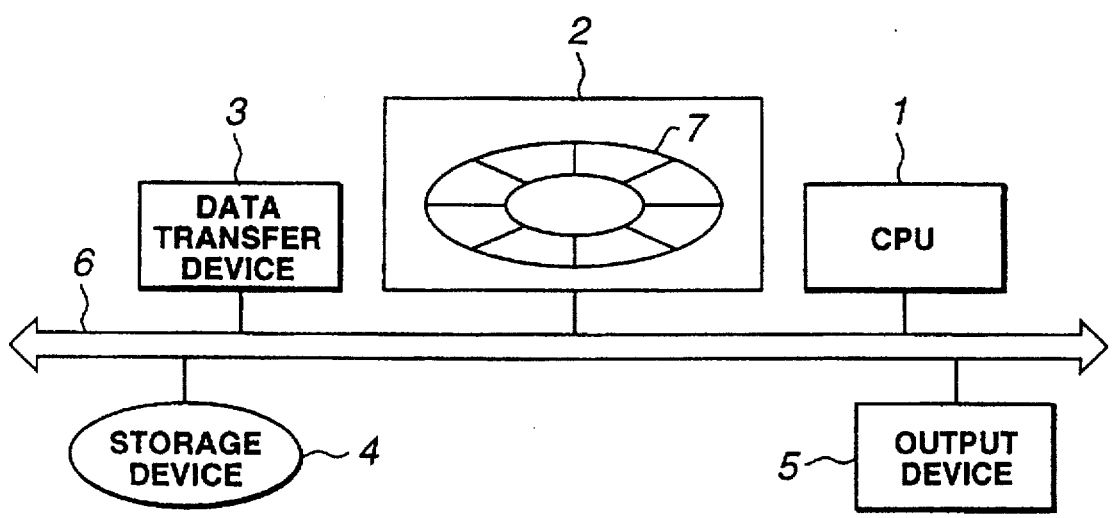
FIG. 1 is a diagrammatic view showing the structure of a signal reproducing apparatus in accordance with the present invention.

Referring now to the drawings, like reference numerals denote like or corresponding parts throughout the drawing figures.

As previously indicated, in the system of the present invention, four types of data are typically used. The first two types of data, e.g., compression data to be decompressed (hereinafter "MDEC data") and audio data, i.e., sound and music, are input, i.e., written into the system and preferably processed in real-time. The other two types of data, e.g., polygon data and special effects data, need not be processed in real-time.

In the present invention, the real-time data is read from the recording medium and written into the system in real-time. However, as the load on the system increases, the variable reading speed of the CPU may not be able to fetch and process the input data rapidly enough to keep up with the input. If this occurs, some of the real-time data will be improperly discarded resulting in substantial undesirable glitches in the output.

In accordance with the present invention, a ring buffer or other suitable intermediate storage means is used to store the real-time data as it is input to the system. In this way, the ring buffer minimizes the loss of any real-time data. The ring buffer accomplishes this function by providing a constant write rate, i.e., input from a CD-ROM or the like to the system, but by varying its read rate, i.e., the output to the CPU. The read rate varies in response to the load on the CPU and, therefore, the read rate can be increased during periods of high system throughput of data and this feature, together with the buffer storage feature, combine to effectively minimize data loss. Accordingly, when writing of data overtakes reading of data, writing is stopped until reading catches up; then one or two frames are typically jumped or abandoned to restore a match between writing in and reading out. Frames are repeated at the output once or twice to compensate for such missing data, but such occurrences are brief, infrequent and virtually unnoticeable.

Hence, while it is possible for a frame of data adjacent to a processed frame to be abandoned, the ring buffer, in accordance with the present invention, reduces, if not eliminates, the need to discard such data.

Referring now to the figures and, more particularly, to FIG. 1, a central processing unit (CPU) 1 composed of a microprocessor and the like, is connected to a bus 6. A memory 2, a data transfer device 3, a storage device 4 and an output device 5 are also interconnected via the bus 6.

A suitable recording medium is provided in the storage device 4, such as a CD-ROM using a compact disc (CD), which is a disc-shaped recording medium and is a read-only optical disc used for optically recording and reproducing data. The storage device 4 may be provided inside of the signal reproducing apparatus, or connected to the bus 6 from outside of the signal reproducing apparatus.

The output device 5 includes plural output devices, such as, a display device like a cathode ray tube (CRT) display device for picture output and a speaker device for audio output.

The recording data on the CD-ROM in the storage device 4 is next described.

Figure 2:
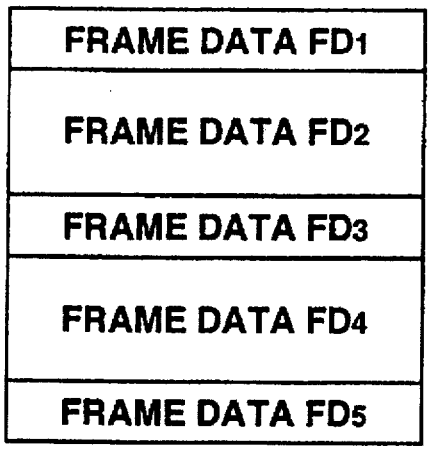
FIG. 2 illustrates frame data for use by the system of the present invention.

FIG. 2 shows frame data recorded on the CD-ROM. The frame data represents the processing unit of data in file data.

As shown in FIG. 2, frame data $FD_1$, $FD_2$, $FD_3$, $FD_4$, $FD_5$, ... are sequentially recorded to form one unit of file data. The frame data $FD_1$ to $FD_5$ may differ in size.

Figure 3:
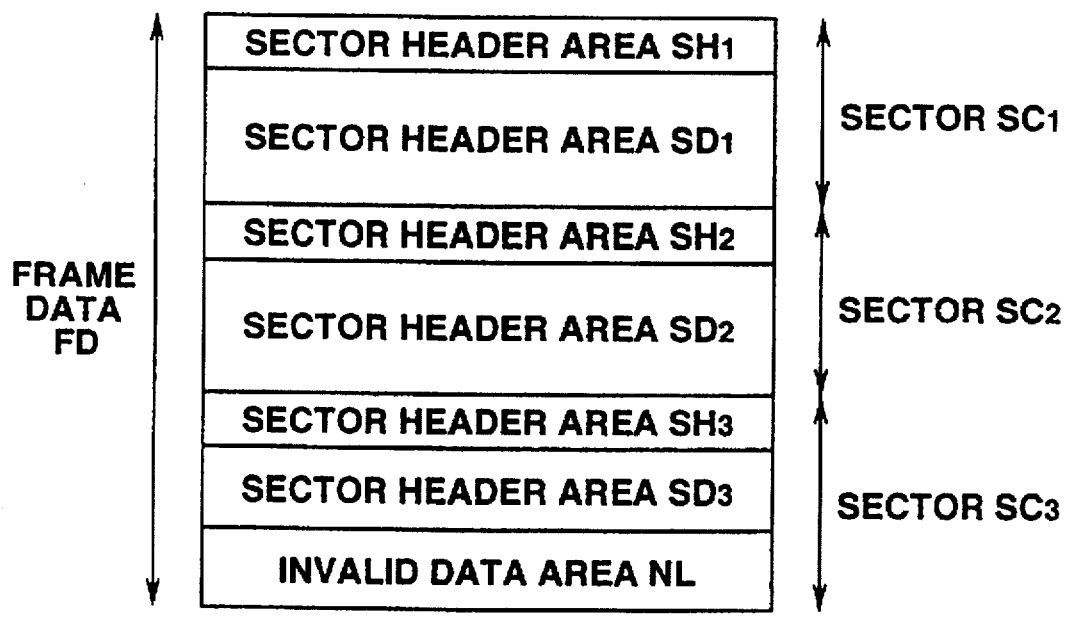
FIG. 3 illustrates sectors for use by the system of the present invention.

The internal structure of the frame data is shown in FIG. 3. The frame data FD includes sectors as smaller blocks. FIG. 3 illustrates the case where one unit of frame data FD has three sectors $SC_1$ to $SC_3$. The sector SC is the physical reading unit of data from the CD-ROM in the storage device 4, and has a fixed data size.

Each of the sectors $SC_1$ to $SC_3$ includes a sector head area SH which is an additional information area of the sector SC and a sector data area SD composed of picture and audio data. Each of the sector header areas $SH_1$ to $SH_3$ is for storing contents of the sector in which the sector header area is included and data for indicating the position in the entire frame data FD.

The picture and audio data in the frame data are tightly stored sequentially from the sector data area $SD_1$ in the leading sector $SC_1$ to the sector data $SD_2$ to $SD_3$ without having a spacing between the areas. In this case, when the size of the frame is smaller than the total capacity of the plural sector data areas SD in the frame data FD, invalid data is stored in a residual portion of the sector data area SD. More particularly, as shown in FIG. 3, since the size of the data included in the frame data FD is smaller than the total capacity of the three sector data areas $SD_1$ to $SD_3$, an invalid data area NL having invalid data stored therein is present following the final sector data area $SD_3$.

The sector header area SH includes, from the leading portion, a frame data format identifier FID for specifying a data format of the frame data FD, a sector number SN indicating the serial number from the leading sector in the frame data FD of the sector having the sector header area SH, the total number of sectors HS indicating the total number of sectors of the frame data FD including this sector header SH, a frame number FN indicating the serial number from the leading frame of the frame data in the file data, and a frame data size FS indicating the size of data stored in the sector data area SD in the frame data FD, all as shown in FIG. 4.

Data within one unit of frame data FD are of the same format. Therefore, when plural sectors SC are present in the frame data FD, the frame data format identifiers FID of the sector header areas SH in the sectors SC have the same value. Furthermore, the frame data sizes FS in the sector header areas SH have the same value when plural sector header areas SH are present in the frame data FD to which the sector header area SH including the frame data size FS belongs.

Referring now again to FIG. 1, the CPU 1 transmits a control signal for reading out data through the bus 6 to the storage device 4 having a CD-ROM as a storage medium. From the storage device 4, data at a desired position on the CD-ROM is read out for every sector in response to the control signal fed to it.

The read-out sector data is transmitted to and stored in a ring buffer 7 in the memory 2 by the data transfer device 3. The ring buffer 7 may be realized either with software or hardware. Of course, those of ordinary skill in the art will appreciate that variations in the design of this configuration for buffering, writing, and reading data may be made without departing from the spirit and scope of the invention.

The data transfer device 3, which is to perform control of direct memory access transfer (DMA), is controlled by the control signal from the CPU 1. The data transfer device 3 transfers the data read out from the storage device 4 to the ring buffer 7 at a high speed, where the data is stored.

Separately from the operation to store the sector data in the ring buffer 7, the control signal is fed from the CPU 1 to the memory 2. On the basis of this control signal, the data stored in the ring buffer 7 is read out for every frame. The contents of the frame data read out from the ring buffer 7 are discriminated by the CPU 1, and processing based on the result of discrimination is carried out. The processed frame data is fed to one of the output devices in the output device 5. Thus, an information signal is outputted from the output device to which the data has been fed.

Since the data processing in the signal reproducing apparatus in this embodiment is not related to the contents of data to be processed, data of various formats can be entered in the sector data area SD. For example, by entering picture data in the sector data area SD, it is possible to reproduce sequentially changing still pictures, that is, motion pictures. By entering audio data, it is possible to sequentially reproduce audio data. In addition, by entering data of an arbitrary format in the sector data area SD, it is possible to realize sequential processing in accordance with temporal changes of the data.

As described above, frame data is composed of data of a single format. However, plural frame data may be composed of data of different data formats, and these data may be included simultaneously in one data series. The signal reproducing method in this embodiment is next described.

In the signal reproducing apparatus shown in FIG. 1, frame data is transferred for every sector between the CD-ROM in the storage device 4 and the ring buffer 7 in the memory 2 under the control of the CPU 1. In this regard, the frame data is read out for every sector from the CD-ROM in the storage device 4. Data read-out processing for transferring the read-out sector data stored in the ring buffer 7 in the memory 2 using the data transfer device 3 and storing the data therein, and frame data processing for reading out data stored in the ring buffer 7 for every frame and transferring the processed data to the output device, are carried out. These two data processing operations are separately carried out under the control of CPU 1, and are essentially synchronized by the ring buffer 7.

The data read-out processing is next described.

Figure 5:
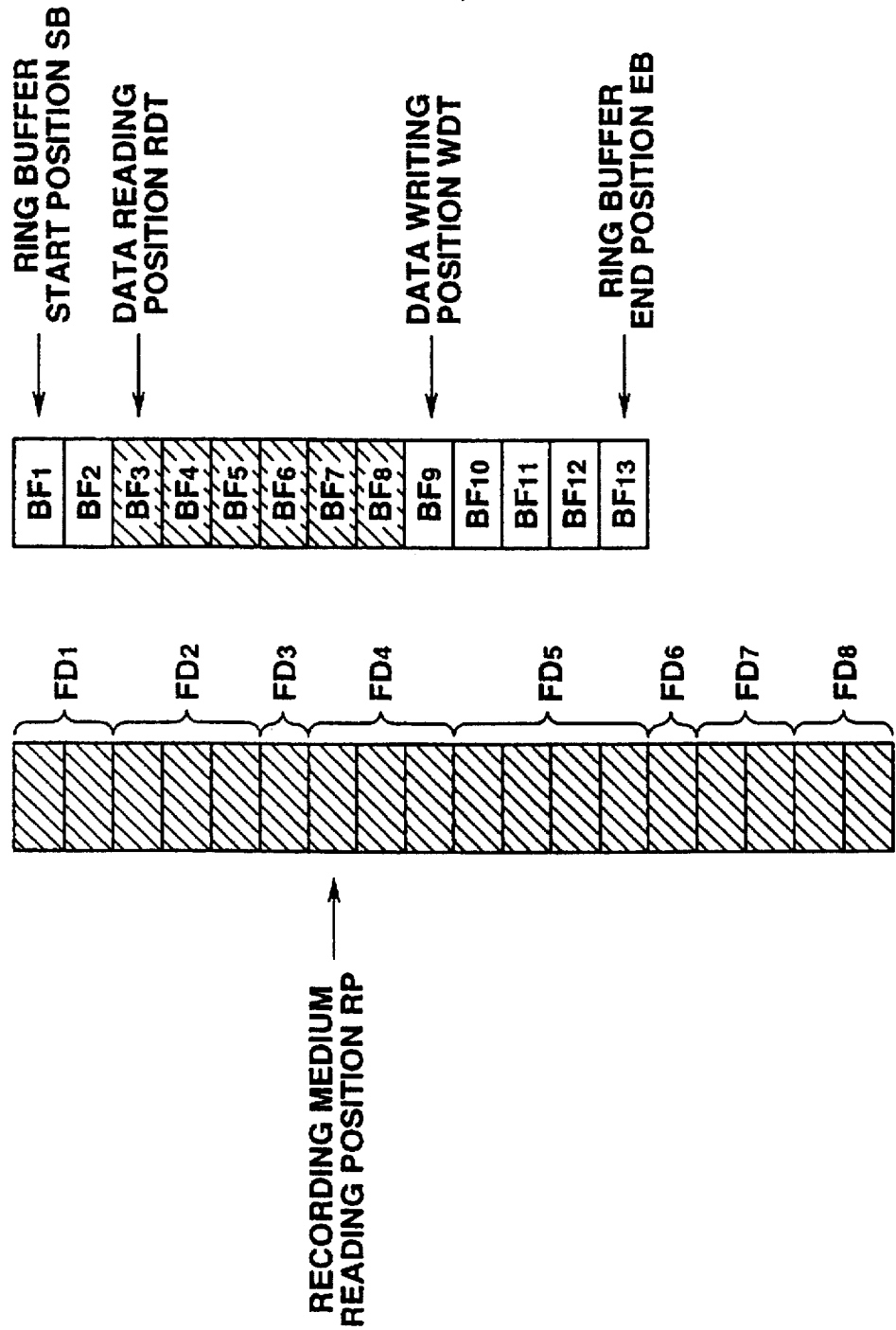
FIGS. 5A and 5B illustrate data read-out processing in accordance with the present invention.

FIG. 5A illustrates serially the data area of the CD-ROM, in which frame data $FD_1$ to $FD_8$ are recorded. To indicate the sector in the frame data to be read out from the CD-ROM, a recording medium reading position RP is employed. In the CD-ROM of FIG. 5A, the data is read out for every sector from the leading sector of the frame data $FD_4$ in which the recording medium reading position RP is present, and data is written into the ring buffer 7 by the data transfer device 3 every time data of one sector is read out. The recording medium reading position RP is moved to a next sector every time data of one sector is read out.

FIG. 5B shows the data area of the ring buffer 7. The ring buffer 7 has a structure in which plural sector data storage areas are serially arrayed with each of the sector data storage areas having a capacity of one-sector of data. The ring buffer 7 can be freely accessed in both the data read-out processing and the frame data processing.

In the ring buffer 7 which has 13 sector data storage areas BF from a sector data storage area $BF_1$ indicated by a ring buffer start position SB to a sector data storage area $BF_{13}$ indicated by a ring buffer end position EB, as shown in FIG. 5B, sector data is written in the sector data storage areas $BF_3$ to $BF_8$, and the position where sector data is written next is denoted by a data writing position WDT. The data writing position WDT is moved to a next sector data storage area every time one-sector of data is written in the sector data storage area BF.

However, when the data writing position WDT is at the same position as the ring buffer end position EB, that is, the sector data storage area $BF_{13}$, with one-sector data written in the sector data storage area $BF_{13}$, the data writing position WDT is moved to the same position as the ring buffer start position SB, that is, the sector data storage area $BF_1$.

The data read-out processing for reading out the frame data $FD_4$ in which the recording medium reading position RP of FIG. 5A is present and storing the data in the ring buffer 7 is next described.

The frame data FD4 consists of three sectors. The leading sector data is read out to be written in the sector data storage area $BF_9$ in which the data writing position WDT is present. Then, the recording medium reading position RP moves to the second sector of the frame data FD4, and the data writing position WDT also moves to the sector data storage area $BF_{10}$. Next, the second sector data of the frame data $FD_4$ is read out to be stored in the sector data storage area $BF_{10}$. Similarly, the final sector data of the frame data $FD_4$ is stored in the sector data storage area $BF_{11}$.

FIG. 5B shows the ring buffer 7 in a state in which data is stored in six sector data storage areas BF and is not stored in the remaining seven sector data storage areas BF.

When data of frame data consisting of eight or more sectors is read out from the ring buffer 7, data is sequentially written for every sector by the foregoing method. However, when data is written in all the sector data storage areas of the ring buffer 7 with the data writing position WDT coinciding with the data reading position RDT, writing of data to the ring buffer 7 is halted. The data writing position WDT of the ring buffer 7 is returned to the position of a sector data storage area next to a sector data storage area in which the final sector data of the frame data preceding to the frame data of the currently halted writing and stored in the ring buffer 7 is correctly stored. That is, data of one frame currently being read out from the CD-ROM is abandoned.

In this case, the recording medium reading position RP in the CD-ROM of FIG. 5A is moved to the leading sector of the frame data next to the frame data of the halted writing.

Then, the writing of data to the ring buffer 7 is resumed at the leading sector of the frame data next to the abandoned frame data.

When the data reading position and the data writing position in the ring buffer 7 for storing data for every sector read out from the CD-ROM are present in the sector data storage area at the same position in carrying out reading of recording data on the CD-ROM and reproduction of the recording data in real time, data of one frame recorded in the recording medium is cancelled from the ring buffer 7, and the data of one frame being read out from the CD-ROM is not reproduced. Thus, the read-out data can be reproduced in real time at a speed corresponding to the reading speed (writing input to the system) of the frame data from the CD-ROM, with a minimum of data loss.

To detect a cut point between frame data, the sector number SN and the total number of sectors HS in the sector header area SH, as shown in FIG. 4, are utilized. When a sector of a cut point, that is, the final sector of frame data composed of 15 sectors is to be detected, whether or not the value of the total number of sectors HS and the value of the sector number SN of the sector header area SH are the same value, that is 15, is detected with respect to each of sectors constituting the frame data. Thus, the sector of the cut point between the frame data can be detected.

The frame data processing is next described.

Figure 6:
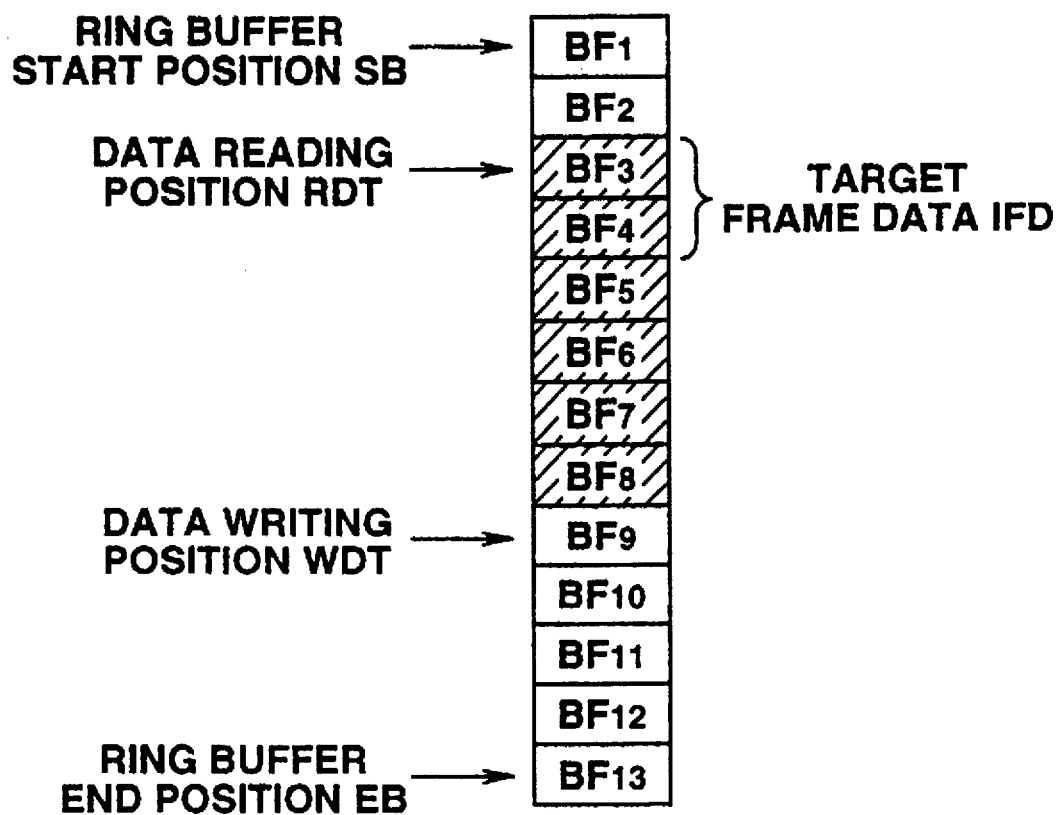
FIG. 6 illustrates frame data processing in accordance with the present invention.

If frame data is stored in the ring buffer 7, data of one frame from the data reading position RDT is used as target frame data. More specifically, frame data having a leading sector in which the data reading position is present is used as target frame data IFD, as shown in FIG. 6. The CPU 1 identifies the data format included in the frame data from the contents of the frame data format identifier FID of the sector header area SH in the sector of the target frame data IFD. In addition, the CPU 1 performs predetermined processing for the identified data format, and transfers the data as information signals, such as picture signals or audio signals, to the output device 5. The transferred information signals are outputted from a display device or a speaker device corresponding to the information signals in the output device 5.

To identify whether frame data is included in the ring buffer 7 or not, it is necessary to detect whether or not the frame data includes a sector having a sector header area SH in which the data reading position RDT and the data writing position WDT differ and in which the total number of sectors HS and the sector number SN shown in FIG. 4 have the same value.

When the frame data is picture data, the predetermined processing is specifically signal processing for displaying the picture data as picture output signals on the screen of the display device. When the frame data is audio data, the predetermined processing is signal processing for transmitting the audio data as audio signals to a terminal of the speaker device.

Figure 7:
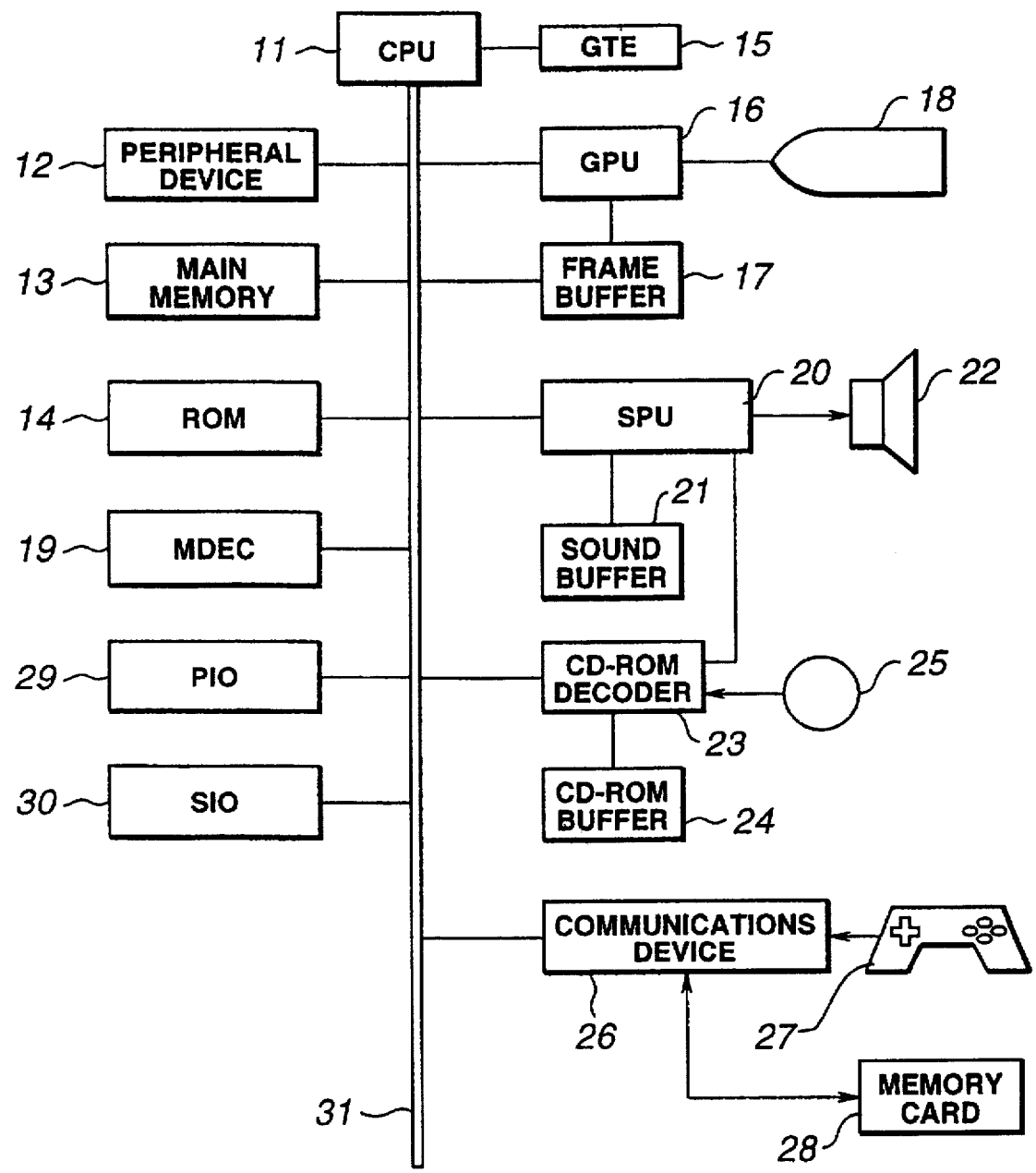
FIG. 7 is a block diagram showing the structure of the overall system arrangement of a home game unit.

The signal reproducing method employed for the signal reproducing device is preferably adapted for home game units and the like. FIG. 7 illustrates the structure of an embodiment of a home game unit using this signal reproducing method.

The home game unit in FIG. 7 includes a bus 31 which is connected to plural processors and devices for realizing various functions in a main system including a CPU 11 and a peripheral device 12, a graphics system, a sound system, a CD-ROM system and a communications system.

The CPU 11 of the main system is a 32-bit reduced instruction set computer (RISC) CPU. The peripheral device 12 includes plural controllers, such as, DMA, timer and interrupt. A main memory 13 with a capacity of 2 MBytes, a ROM 14 having a capacity of 512 KBytes with an operating system (OS) program stored therein for controlling the operation of the CPU 11 and the peripheral device 12 to control the home game unit, a PIO 29 as an input/output (I/O) part of parallel communications, and an SIO 30 as an input/output (I/O) part of serial communications are also connected to the bus 31.

When the power of the home game unit is turned on, the CPU 11 executes the operating system (OS) in the ROM 14 to initialize the entire device. At a control command by the CPU 11, an application program, that is, a game program or picture or audio data loaded in a CD-ROM drive 25 of the CD-ROM system is read out from the CD-ROM.

In this regard, the picture data recorded in the CD-ROM includes picture data of a motion picture or a still picture which has been orthogonally transformed by discrete cosine transform (DCT) and compressed, and picture data of a texture picture for modifying a polygon. As the picture data of a motion picture or a still picture, data compressed on the basis of the standard of Joint Photographic Experts Group (JPEG) as an international standard for compression of still picture data, and data compressed only by intra-frame encoding on the basis of the standard of Moving Picture Image Coding Experts Group (MPEG) as an international standard for compression of motion pictures, are employed. The game program from the CD-ROM includes a polygon drawing command for drawing a minute polygonal area or a polygon.

The audio data recorded in the CD-ROM includes 16-bit PCM data based on the CD-DA standard for audio data in music CDs, and adaptive differential PCM (so-called ADPCM) data based on the CD-ROM XA standard for CD-ROM picture and audio data.

The data read out from the CD-ROM is stored in the CD-ROM buffer 24, and is then decoded by a CD-ROM decoder 23. The resulting data is fed to the main system, the graphics system or the sound system in accordance with the contents of the data.

The graphics system includes a geometry transfer engine (GTE) 15 as a graphics data generating processor, a graphics processing unit (GPU) 16 as a graphics drawing processor, a frame buffer 17 with a capacity of 1 MBytes used for generating a picture by the GPU 16, a motion decoder (MDEC) 19 as a picture data expanding engine, and a video output unit 18, such as, a CRT display unit or a liquid crystal display (LCD) unit.

The GTE 15, used as a co-processor of the CPU 11, carries out, at a high speed, coordinate conversion or light source calculation for a polygon expressing a three-dimensional object in a picture, for example, calculation of a matrix or a vector in the fixed decimal mode, with a parallel processing mechanism when the CPU 11 generates the drawing command or the control command.

The GPU 16, operative in accordance with the polygon drawing command from the CPU 11, draws a polygon in the frame buffer 17 mapped in a two-dimensional address space independent of the CPU 11. The GPU 16 performs flat shading in which a polygon is drawn in the same color, Gouraud shading in which an arbitrary color is designated for each vertex of the polygon to find the color within the polygon, and texture mapping in which a texture as two-dimensional picture data is applied to the polygon.

Specifically, when the flat shading is carried out in which a polygon of triangle is drawn in the same color, the GTE 15 can perform coordinate calculation at a maximum rate of approximately 1.5 million polygons per second. When the Gouraud shading or the texture mapping is carried out, the GTE 15 can perform coordinate calculation of approximately 5 hundred thousand polygons per second at the maximum. Therefore, it is possible to reduce the load on the CPU 11 and to carry out high-speed coordinate calculation.

The frame buffer 17 includes a so-called dual port RAM of 16 bits, which is a rectangular area of 512 vertical pixels and 1024 horizontal pixels. The frame buffer 17 is used for drawing of pictures by the GPU 16 and enclosure of data transferred from the main memory 13. The drawing by the GPU 16 or the data transfer from the main memory 13, and reading of picture data are carried out simultaneously. In the frame buffer 17, a texture area in which a texture pattern is stored and a CLUT area in which a color lookup table (CLUT) used as a color pallet is stored are provided. The texture pattern and the CLUT data are read out from the CD-ROM drive 25 under the control by the CPU 11, then transferred via the GPU 16 to the frame buffer 17, and stored therein. The CLUT data may also be generated by the GPU 16.

Accordingly, the GPU 16 draws the polygon using the coordinate and color information found by the GTE 15, and applies the texture to the polygon so as to produce a three-dimensional (3D) picture. The resulting picture data is outputted as a picture signal to the video output unit 18, so that the three-dimensional (3D) picture is displayed.

When a motion picture is to be displayed, two rectangular areas are provided on the frame buffer 17, and the two rectangular areas are used alternately for drawing and for picture display so that a frame picture is drawn in one of the rectangular areas with data of a frame picture drawn in advance in the other rectangular area being outputted to the video output unit 18 to display the picture. Thus, a state of picture rewriting is prevented from being displayed on the video output unit 18.

The MDEC 19, used for reproducing picture data read out from the CD-ROM 25, carries out parallel operation using the main memory 13 in common with the CPU 11. The data for motion pictures read out from the CD-ROM drive 25 is error-corrected by the CD-ROM decoder 23 and is fed to the MDEC 19. The MDEC 19 decodes the data fed thereto. The decoded data is then fed as motion picture data to the main memory 13. The motion picture data fed to the main memory 13 is stored in the frame buffer 17 via the GPU 16, and is then outputted as a picture signal to the video output unit 18 so that the motion picture is displayed.

The sound system includes a sound processing unit or so-called SPU 20 as a sound reproducing processor, a sound buffer 21 of 512 KBytes used for the SPU 20 to reproduce sound signals, and a sound output unit 22, such as, a speaker unit.

The SPU 20 has an ADPCM decoding function to reproduce audio data produced by performing ADPCM of 16-bit audio data to a 4-bit differential signal, a reproducing function to reproduce sound source data stored in the sound buffer 21 to generate sound effects, and a modulating function to modulate the sound source data for reproduction.

Audio data used for background music (BGM) and sound source data used for generating sound effects are recorded in the CD-ROM. These data are read out from the CD-ROM drive 25 and error-corrected by the CD-ROM decoder 23 under the control of the CPU 11.

The audio data used for BGM is fed from the CD-ROM decoder 23 to the SPU 20 under the control of the CPU 11, and is outputted as musical tunes from the sound output unit 22 by the SPU 20. The sound source data used for sound effects is stored in the sound buffer 21 under the control of the CPU 11. The SPU 20 generates musical sounds and sound effects based on the sound source data stored in the sound buffer 21. Thus, the SPU 20 is a so-called sampling sound source.

The communications system includes a controller 27 as an input device or an input pad, a memory card 28 of 1 MBytes, and a communications device 26 as a synchronization serial port.

The controller 27 has a key for entering an instruction for controlling the proceedings of a game and the motion of an object displayed in the game. The operation information entered from the controller 27 is fed to the communications device 26. The information fed to the communications device 26 is read out by the CPU 11 approximately every 1/60 second. The CPU 11 sends the control command for controlling the operations of the peripheral device 12, the main memory 13, the graphics system, the sound system, and the CD-ROM system, to control the operations of these systems. Thus, pictures corresponding to the entered operation information is displayed and sounds are outputted.

The memory card 28 includes a non-volatile memory, such as a flash memory, and is used for storing and holding the setting, states of proceedings and results of plural games. Since the memory card 28 is separated from the bus 31, the memory card 28 can be attached or detached with the power on. Thus, it is possible to attach and detach plural memory cards during the operation of the home game unit so as to store data.

The game unit may be connected to the peripheral device via the PIO port 29. The game unit may also have communications with other game units via the SIO port 30.

In the home game unit, it is necessary to transfer a large amount of picture data at a high speed between the main memory 13, the GPU 16, the MDEC 19 and the CD-ROM decoder 23 when reading of the game program, display of the picture data or drawing of the picture data is to be carried out. In this case, so-called DMA transfer is carried out in which the picture data is directly transferred under the control of the peripheral device 12, not via the CPU 11. Thus, the load on the CPU 11 due to data transfer is reduced, and high-speed data transfer is carried out.

As is clear from the above description, the signal reproducing apparatus for performing reproduction by reading data recorded on a recording medium, in accordance with the present invention, includes a recording medium having data sequentially stored therein for every frame as a data processing unit composed of one or plural sectors as physical read-out units of data, or ring-shaped storage means for storing the data read out from the recording medium, data control means for sequentially reading frame data from the recording medium for every sector and storing the frame data in the ring-shaped storage means, and separately therefrom, reading the data stored in advance in the ring-shaped storage means for every frame, whereby when sector data read out from the recording medium cannot be written in the ring-shaped storage means, frame data next to data of a frame including the read-out sector is stored following frame data preceding to the frame including the read-out sector in the ring-shaped storage means. Thus, when the frame data read out from the recording medium is to be reproduced in real time, the data can be reproduced at a speed corresponding to the reading speed of the data from the recording medium. Also, since data for every frame as the unit for data processing can be rapidly and reliably outputted, failure or lack of data in the frame is minimized. In addition, as the data for every frame is read out from the recording medium and is stored, data of various formats can be processed regardless of the type of data involved.

The sector is composed of an additional information area having a data format of a frame in which this sector is included, a sector number indicating the sequence of sectors constituting the frame and the total number of sectors indicating the number of sectors constituting the frame, and a data area. The data control means uses the sector number and the total number of sectors in the sector to detect a final sector of the frame including the sector. Thus, positional information and data information in the frame can be sequentially detected every time data is read out for every sector, so that the cut point of the frame data can be quickly detected.

The signal reproducing method, in accordance with the present invention includes a data reading step for reading frame data for every sector from a recording medium which has data sequentially stored therein for every frame as a data processing unit composed of one or plural sectors as physical read-out units of data, and storing the frame data in ring-shaped storage means, and a frame data processing step for reading data stored in advance in the ring-shaped storage means for every frame, separately from the data reading step, whereby when sector data read out from the recording medium cannot be written in the ring-shaped storage means, frame data next to data of a frame including the read-out sector is stored following frame data preceding to the frame including the read-out sector in the ring-shaped storage means. Thus, when the frame data read out from the recording medium is to be reproduced in real time, the data can be reproduced essentially at a speed corresponding to the reading speed of the data from the recording medium. Moreover, since data for every frame, as the unit for data processing in the system can be rapidly and reliably outputted, data omissions are minimized. In addition, since the data for every frame is read out from the recording medium and is then stored, data of a variety of different formats can be processed regardless of the type of data included.

The sector is composed of an additional information area having a data format of a frame in which this sector is included, a sector number indicating the sequence of sectors constituting the frame and the total number of sectors indicating the number of sectors constituting the frame, and a data area. The data control means uses the sector number and the total number of sectors in the sector to detect a final sector of the frame including the sector. Thus, positional information and data information in the frame can be sequentially detected every time data is read out for every sector, so that the cut point of the frame data can be quickly detected.

Hence, the present invention satisfies a long felt need for enhanced efficiencies in writing in and the reading out of data.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:
1. A signal reproducing apparatus, comprising:
 (a) first reading means for reading out frame data by a sector from a recording medium;
 (b) writing means for writing the data read out from the first reading means in memory;
 (c) second reading means for reading out the data written in said memory; and
 (d) controlling means for controlling when said writing means stops writing said data, so that said first reading means can start reading the frame data next to the frame data being read out, said writing means being resetable to a predetermined position whereby data is selectively abandoned to match writing and reading for minimizing data loss.

2. An apparatus as set forth in claim 1, wherein said memory includes a ring-shaped address means.

3. An apparatus as set forth in claim 1, wherein said sector has a sector header indicating sector number and the total number of sectors of frame data.

4. An apparatus as set forth in claim 1, wherein said writing means stops writing when the reading address of said second reading means coincides with the writing address.

5. A signal reproducing system, comprising:
 (a) first reading apparatus which reads out frame data by a sector from a recording medium;
 (b) writing apparatus which writes the data read out from said first reading means in memory;

(c) second reading apparatus which reads out said data written in said memory; and (d) apparatus which controls when said writing apparatus stops writing said data, so that said first reading apparatus can start reading the frame data next to the frame data being read out, said writing apparatus being resetable to a predetermined position whereby data is selectively abandoned to match writing and reading for minimizing data loss.

6. An apparatus as set forth in claim 5, wherein said memory includes a ring-shaped address apparatus.

7. An apparatus as set forth in claim 5, wherein said sector has a sector header indicating sector number and the total number of sectors of frame data.

8. An apparatus as set forth in claim 5, wherein said writing apparatus stops writing when the reading address coincides with the writing address.

9. A method for processing a signal, comprising the steps of:

(a) reading out frame data by a sector from a recording medium;

(b) writing the data read out in said reading step in a memory;

(c) reading out the data written in the memory; and (d) controlling the writing of said data, so that the first reading can start reading the frame data next to the frame data being read out, and said writing step may be reset to a predetermined position whereby data is selectively abandoned to match writing and reading for minimizing data loss.

10. A method as set forth in claim 9, wherein said writing step stops writing when a specified reading address coincides with a specified writing address.

11. A signal reproducing system for performing reproduction by reading data recorded in a recording medium, the apparatus comprising:

a recording medium having data sequentially stored therein for every frame as a data processing unit composed of at least one sector as a physical read-out unit of data;

a ring-shaped memory for storing said data read out from said recording medium; and data control apparatus for sequentially reading frame data from said recording medium for every sector and storing the frame data in said ring-shaped memory, and, separately therefrom, reading the data stored in advance in said ring-shaped memory for every frame;

whereby when sector data read out from said recording medium cannot be written into said ring-shaped memory, frame data next to data of a frame including the read-out sector is stored following preceding frame data in said ring-shaped memory so that data is selectively abandoned to match writing and reading for minimizing data loss.

12. A signal reproducing system as set forth in claim 11, wherein said sector includes an additional information area having a data format of a frame in which this sector is included, a sector number indicating the sequence of sectors constituting the frame and the total number of sectors constituting the frame, and a data area, whereby said data control apparatus uses the sector number and the total number of sectors in the frame to detect a final sector of that frame.

13. A signal reproducing method, comprising:

a data reading step for reading frame data for every sector from a recording medium which has data sequentially stored therein for every frame as a data processing unit composed of at least one sector as a physical read-out unit of data, and storing the frame data in a ring-shaped storage means; and a frame data processing step for reading data stored in advance in the ring-shaped storage means for every frame, separately from the data reading step;

whereby when sector data read out from the recording medium cannot be written in the ring-shaped storage means, frame data next to data of a frame including the read-out sector is stored following frame data preceding the frame including the read-out sector in the ring-shaped storage means so that data is selectively abandoned to match writing and reading for minimizing data loss.

14. A signal reproducing method as set forth in claim 13, wherein said sector is composed of an additional information area having a data format of a frame in which this sector is included, a sector number indicating the sequence of sectors constituting the frame and the total number of sectors constituting the frame, and a data area, whereby said data control means uses the sector number and the total number of sectors in the frame to detect a final sector of the frame including the sector.

15. A method for processing a data stream more efficiently, comprising the steps of:

reading data from a recording medium; writing said data to a buffer memory;

reading said data from said buffer memory;

stopping said writing of said data to avoid pile up of data when the rate of reading said data from said memory is insufficient to keep pace with said writing of said data; and subsequently restoring said writing of said data to said buffer memory when said reading of said data has caught up sufficiently to said writing of data whereby data is selectively abandoned to match writing and reading for minimizing data loss.

16. A method as set forth in claim 15, wherein said buffer memory is a ring memory.

17. A method as set forth in either of claims 15 or 16, wherein the speed of said writing is at a constant rate of speed during writing.

18. A method as set forth in either of claims 15 or 16, wherein the speed of said reading is variable.

19. A method as set forth in either of claims 15 or 16, wherein the speed of said writing is at a high constant rate during writing, and the speed of said reading is varied in accordance with data processing load.

* * * * *